United States Patent
Song et al.

(10) Patent No.: US 9,247,555 B2
(45) Date of Patent: Jan. 26, 2016

(54) DATA TRANSMISSION METHOD, APPARATUS, AND COMMUNICATIONS SYSTEM

(71) Applicant: Huawei Technologies Co., Ltd., Shenzhen (CN)

(72) Inventors: Weiwei Song, Shenzhen (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/601,125

(22) Filed: Jan. 20, 2015

(65) Prior Publication Data

US 2015/0133141 A1    May 14, 2015

Related U.S. Application Data

(63) Continuation of application No. PCT/CN2013/077634, filed on Jun. 21, 2013.

(30) Foreign Application Priority Data

Jul. 20, 2012    (CN) .......................... 2012 1 0253442

(51) Int. Cl.
*H04W 92/10*    (2009.01)
*H04W 72/08*    (2009.01)
(Continued)

(52) U.S. Cl.
CPC ........ *H04W 72/085* (2013.01); *H04W 72/0406* (2013.01); *H04W 72/0413* (2013.01); *H04W 28/18* (2013.01); *H04W 48/12* (2013.01); *H04W 88/02* (2013.01); *H04W 88/08* (2013.01)

(58) Field of Classification Search
CPC . H04W 76/022; H04W 84/047; H04W 12/10; H04W 36/0055; H04W 4/00; H04W 92/04; H04W 92/20; H04B 7/24; H04B 7/26; H04B 7/2606; H04J 11/0069
See application file for complete search history.

(56) References Cited

U.S. PATENT DOCUMENTS

2009/0092097 A1    4/2009    Nylander et al.
2010/0260096 A1    10/2010    Ulupinar et al.
(Continued)

FOREIGN PATENT DOCUMENTS

CN    101816209 A    8/2010
CN    101902788 A    12/2010
(Continued)

OTHER PUBLICATIONS

"IEEE Standard for Information technology—Telecommunications and information exchange between systems; Local and metropolitan area networks—Specific requirements," IEEE Standards Association, IEEE Computer Society, IEEE Std 802.11-2012, Mar. 29, 2012, 2793 pages.
(Continued)

*Primary Examiner* — Quan M Hua
(74) *Attorney, Agent, or Firm* — Slater & Matsil, L.L.P.

(57) ABSTRACT

Embodiments of the present invention provide a data transmission method, an apparatus, and a communications system. The method includes sending, by a macro base station, a configuration request message to an access node, where the configuration request message includes a bearer configuration parameter that carries a radio bearer (RB) identifier; receiving, by the macro base station, a configuration success message from the access node, where the configuration success message carries at least physical layer parameter configuration information that is configured by the access node for a user equipment; and sending, by the macro base station, a reconfiguration message to the user equipment. The reconfiguration message includes at least the RB identifier and/or a logical channel identifier that is reconfigured to transmit on the access node and the physical layer parameter configuration information of the access node.

20 Claims, 11 Drawing Sheets

(51) Int. Cl.
*H04W 72/04* (2009.01)
*H04W 48/12* (2009.01)
*H04W 28/18* (2009.01)
*H04W 88/02* (2009.01)
*H04W 88/08* (2009.01)

(56) References Cited

U.S. PATENT DOCUMENTS

2010/0278141 A1* 11/2010 Choi-Grogan .... H04W 36/0083 370/331
2012/0309394 A1* 12/2012 Radulescu ........ H04W 36/0055 455/436
2013/0203382 A1 8/2013 Takahashi et al.

FOREIGN PATENT DOCUMENTS

| CN | 102404809 A | 4/2012 |
| WO | 2010048569 A1 | 4/2010 |
| WO | 2012023514 A1 | 2/2012 |

OTHER PUBLICATIONS

3rd Generation Partnership Project; Technical Specification Group Radio Access Network; Evolved Universal Terrestrial Radio Access (E-UTRA); Radio Resource Control (RRC); Protocol Specification (Release 11), 3GPP TS 36.331, V11.0.0, Jun. 2012, 302 pages.

"3rd Generation Partnership Project; Technical Specification Group Radio Access Network; Evolved Universal Terrestrial Radio Access Network (E-UTRAN); X2 Application Protocol (X2AP) (Release 11)," 3GPP TS 36.423, V11.1.0, Jun. 2012, 134 pages.

* cited by examiner

DATA TRANSMISSION METHOD, APPARATUS, AND COMMUNICATIONS SYSTEM

This application is a continuation of International Application No. PCT/CN2013/077634, filed on Jun. 21, 2013, which claims priority to Chinese Patent Application No. 201210253442.8, filed on Jul. 20, 2012, both of which are hereby incorporated by reference in their entireties.

TECHNICAL FIELD

The present invention relates to the communications field, and in particular, to a data transmission method, an apparatus, and a communications system.

BACKGROUND

With the development of mobile communications technologies and large-scale deployment of a 3G (3rd generation mobile communications technologies) network, a communications service with large bandwidth and a high rate significantly enhances user experience. However, despite infusion of fresh vigor into the communications service due to large-scale popularization of a smartphone, more challenges to operation of the communications service are caused consequently. Due to a limited throughput, the 3G network cannot support such huge traffic. Currently operating networks have been under great pressure and can satisfy only a part of requirements even for large-scale deployment of LTE (Long Term Evolution) system in future.

Pressure of a communications network is relieved by means of separating user plane data and control plane signaling, that is, a link from an access node to a user equipment is responsible only for transmitting user plane data, and a link from a macro base station to the user equipment is used to transmit control plane signaling that is from the access node to the user equipment. However, some user plane data needs to be transmitted at a macro base station having a high QoS (quality of service) guarantee, whereas some control plane signaling has a relatively low QoS requirement and does not need to occupy a system resource having a high QoS guarantee. Therefore, simply separating user plane data and control plane signaling results in poor QoS of a service and low usage of a system resource.

SUMMARY

Embodiments of the present invention provide a data transmission method, an apparatus, and a communications system, which can ensure QoS of a service and improve usage of a system resource.

To achieve the foregoing objective, the embodiments of the present invention use the following technical solutions:

According to one aspect, the present invention provides a data transmission method. In an embodiment, a macro base station sends a configuration request message to an access node, where the configuration request message includes a bearer configuration parameter that carries a radio bearer (RB) identifier, so that the access node completes bearer configuration according to the bearer configuration parameter; receives a configuration success message from the access node, where the configuration success message carries at least physical layer parameter configuration information that is configured by the access node for a user equipment; and sends a reconfiguration message to the user equipment, where the reconfiguration message includes at least the RB identifier and/or a logical channel identifier that is reconfigured to transmit on the access node and the physical layer parameter configuration information of the access node, so that after the user equipment completes physical layer configuration according to the physical layer parameter configuration information, the user equipment sends signaling and/or service data to the access node according to the RB identifier and/or the logical channel identifier that is reconfigured to transmit on the access node.

According to another aspect, the present invention provides a data transmission method, including: receiving, by an access node, a configuration request message from a macro base station, where the configuration request message includes a bearer configuration parameter that carries a radio bearer (RB) identifier; completing, by the access node, bearer configuration according to the bearer configuration parameter; and sending, by the access node, a configuration success message to the macro base station, where the configuration success message carries at least physical layer parameter configuration information that is configured by the access node for a user equipment, so that the macro base station sends a reconfiguration message to the user equipment, where the reconfiguration message includes at least the RB identifier and/or a logical channel identifier that is reconfigured to transmit on the access node and the physical layer parameter configuration information of the access node, so that after the user equipment completes physical layer configuration according to the physical layer parameter configuration information, the user equipment sends signaling and/or service data to the access node according to the RB identifier and/or the logical channel identifier that is reconfigured to transmit on the access node.

According to another aspect, the present invention provides a data transmission method, including: receiving, by a user equipment, a reconfiguration message from a macro base station, where the reconfiguration message includes at least an RB identifier and/or a logical channel identifier that is reconfigured to transmit on an access node and physical layer parameter configuration information of the access node, and the reconfiguration message is sent after that: the macro base station sends a configuration request message to the access node, where the configuration request message includes a bearer configuration parameter that carries the RB identifier, so that after the access node completes bearer configuration according to the bearer configuration parameter, the macro base station receives a configuration success message from the access node, where the configuration success message carries at least the physical layer parameter configuration information that is configured by the access node for the user equipment; completing, by the user equipment, physical layer configuration according to the physical layer parameter configuration information; and sending, by the user equipment, signaling and/or service data to the access node according to the RB identifier and/or the logical channel identifier that is reconfigured to transmit on the access node.

Preferably, that the user equipment performs signaling or service data transmission with the access node according to the physical layer parameter configuration information includes: enabling, by the user equipment according to basic information about the access node, a radio frequency receiver of the user equipment, or adjusting, by the user equipment according to the basic information about the access node, a distance between the radio frequency receiver of the user equipment and a center frequency location of the access node; and sending, by the user equipment, a reconfiguration completion message to the access node, where the reconfiguration completion message includes an identifier of the user equipment, so that the access node performs signaling or service data transmission with the user equipment according to the physical layer parameter configuration information.

According to one aspect, the present invention provides a macro base station, including: a first transmitter, configured to send a configuration request message to an access node, where the configuration request message includes a bearer configuration parameter that carries a radio bearer (RB) identifier, so that the access node completes bearer configuration according to the bearer configuration parameter; a receiver, configured to receive a configuration success message from the access node, where the configuration success message carries at least physical layer parameter configuration information that is configured by the access node for a user equipment; and a second transmitter, configured to send a reconfiguration message to the user equipment, where the reconfiguration message includes at least the RB identifier and/or a logical channel identifier that is reconfigured to transmit on the access node and the physical layer parameter configuration information of the access node, so that after the user equipment completes physical layer configuration according to the physical layer parameter configuration information, the user equipment sends signaling and/or service data to the access node according to the RB identifier and/or the logical channel identifier that is reconfigured to transmit on the access node.

According to another aspect, the present invention provides an access node, including: a receiving unit, configured to receive a configuration request message from a macro base station and transmit the configuration request message to a parameter configuration unit, where the configuration request message includes a bearer configuration parameter that carries a radio bearer (RB) identifier; the parameter configuration unit, configured to receive the configuration request message sent by the receiving unit, complete bearer configuration according to the bearer configuration parameter, and transmit a configuration success message to a sending unit; and the sending unit, configured to receive the configuration success message sent by the parameter configuration unit, and send the configuration success message to the macro base station, where the configuration success message carries at least physical layer parameter configuration information that is configured by the access node for a user equipment, so that the macro base station sends a reconfiguration message to the user equipment, where the reconfiguration message includes at least the RB identifier and/or a logical channel identifier that is reconfigured to transmit on the access node and the physical layer parameter configuration information of the access node, so that after the user equipment completes physical layer configuration according to the physical layer parameter configuration information, the user equipment sends signaling and/or service data to the access node according to the RB identifier and/or the logical channel identifier that is reconfigured to transmit on the access node.

According to another aspect, the present invention provides a user equipment, including: a receiving module, configured to receive a reconfiguration message from a macro base station and transmit the reconfiguration message to a parameter configuration module and a transmission module, where the reconfiguration message includes at least an RB identifier and/or a logical channel identifier that is reconfigured to transmit on an access node and physical layer parameter configuration information of the access node, and the reconfiguration message is sent after that: the macro base station sends a configuration request message to the access node, where the configuration request message includes a bearer configuration parameter that carries the RB identifier, so that after the access node completes bearer configuration according to the bearer configuration parameter, the macro base station receives a configuration success message from the access node, where the configuration success message carries at least the physical layer parameter configuration information that is configured by the access node for the user equipment; the parameter configuration module, configured to receive the reconfiguration message sent by the receiving module and complete physical layer configuration according to the physical layer parameter configuration information; and the transmission module, configured to receive the reconfiguration message sent by the receiving module, and send signaling and/or service data to the access node according to the RB identifier and/or the logical channel identifier that is reconfigured to transmit on the access node.

According to one aspect, the present invention provides a communications system, including a data transmission apparatus that has any one of the foregoing characteristics.

According to the data transmission method, the apparatus, and the communications system that are provided in the embodiments of the present invention, a macro base station sends, to an access node, a configuration request message that includes a bearer configuration parameter carrying a radio bearer (RB) identifier; after completing bearer configuration according to the bearer configuration parameter, the access node sends, to the macro base station, a configuration success message that carries physical layer parameter configuration information configured by the access node for a user equipment; further, the macro base station sends, to the user equipment, a reconfiguration message that includes the RB identifier and/or a logical channel identifier that is reconfigured to transmit on the access node and the physical layer parameter configuration information, so that the user equipment completes bearer configuration according to the bearer configuration parameter; and after the user equipment completes physical layer configuration according to the physical layer parameter configuration information, the user equipment sends signaling and/or service data to the access node according to the RB identifier and/or the logical channel identifier that is reconfigured to transmit on the access node. By means of this solution, the user equipment can flexibly distinguish, by using the RB identifier and/or the logical channel identifier, between signaling and/or service data that needs to be sent to the access node and signaling and/or service data that needs to be sent to the macro base station, thereby avoiding a problem in the prior art that simply separating user plane data and control plane signaling results in poor QoS of a service and low usage of a system resource, and further ensuring QoS of the service and improving usage of the system resource.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
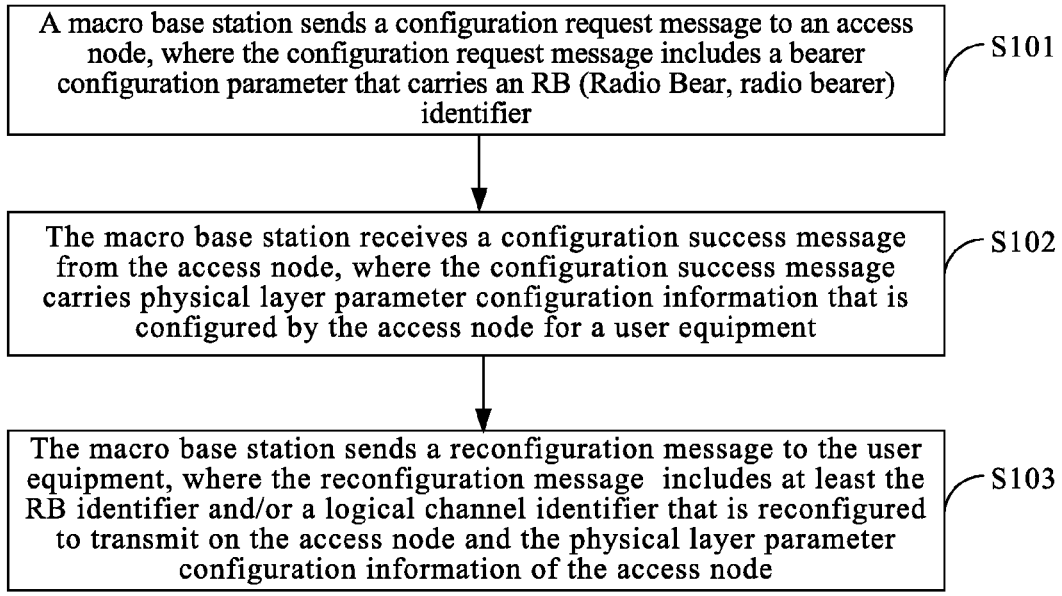
FIG. 1 is a flowchart of a data transmission method according to an embodiment of the present invention.

In the following description, for the purpose of illustration instead of limitation, specific details such as a particular system structure, an interface, and a technology are provided to make the present invention understood thoroughly. However, it should be understood by a person skilled in the art that the present invention can also be implemented in other embodiments without the specific details. In other cases, detailed descriptions of well-known apparatuses, circuits and methods are omitted, so that the present invention is described without being impeded by the unnecessary details.

Various technologies described in this specification may be applied to various wireless communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a general packet radio service (GPRS) system, a Long Term Evolution (LTE) system, and other similar communications systems.

A user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN,). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, it may be a device such as a personal communication service (PCS) phone, a cordless phone, a Session Initiation Protocol (SIP) phone, a wireless local loop (WLL) station, or a personal digital assistant (PDA). The wireless terminal may also be referred to as a system, a subscriber unit (Subscriber Unit), a subscriber station, a mobile station, a mobile terminal, a remote station, an access node, a remote terminal, an access terminal, a user terminal, a user agent, a user device, or a user equipment.

A base station (for example, an access node) may refer to a device in communication with a wireless terminal via one or more sectors at an air interface in an access network. The base station may be configured to mutually convert a received over-the-air frame and an IP packet and serve as a router between the wireless terminal and a remaining portion of the access network, where the remaining portion of the access network may include an Internet Protocol (IP) network. The base station may also coordinate attribute management of the air interface. For example, the base station may be a base station (BTS, Base Transceiver Station) in GSM or CDMA, may also be a base station (NodeB) in WCDMA, and may further be an evolved NodeB (NodeB, eNB, or e-NodeB, evolved Node B) in LTE, which is not limited in the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between associated objects.

An embodiment of the present invention provides a data transmission method. As shown in FIG. 1, the method includes the following steps.

S101. A macro base station sends a configuration request message to an access node, where the configuration request message includes a bearer configuration parameter that carries an RB (radio bearer) identifier.

It should be noted that, the access node may be a micro base station, an indoor base station, a low mobility base station, a local wireless access node, a low-power transmit node, or the like, which is not limited in the present invention.

It should be added that, before the macro base station sends the configuration request message to the access node, the macro base station needs to determine whether a moving user equipment enters a coverage area of the access node. Exemplarily, a method used by the macro base station to determine whether the user equipment enters the coverage area of the access node may include: receiving, by the macro base station, coverage information from the access node, where the coverage information includes location information of the access node and transmit power; determining, by the macro base station, a coverage radius of the access node according to the transmit power; receiving, by the macro base station, location information from the user equipment; and determining, by the macro base station, that the user equipment enters the coverage area of the access node when the macro base station determines, according to the location information of the access node and the location information of the user equipment, that a distance between the access node and the user equipment is less than the coverage radius.

Further, after the macro base station determines that the user equipment enters the coverage area of the access node, the macro base station sends the configuration request message to the access node.

Exemplarily, the configuration request message may include the bearer configuration parameter that carries the RB identifier.

It should be noted that, an RB is a format set for connecting the user equipment, the access node and the micro base station to a radio access network, that is, if a service is generated between the user equipment and the access node, or between the user equipment and the macro base station, an RB must be configured, that is, an RB is equivalent to a carrier of signaling and/or service data that needs to be transmitted.

The macro base station may enable, by setting different identifiers for the RB, the access node and the user equipment to learn how to separate data that needs to be transmitted, that is, the access node can distinguish, by using the RB identifier, between data that needs to be sent to the user equipment and data that needs to be sent to the macro base station, and the user equipment can also distinguish, by using the RB identifier, between data that needs to be sent to the access node and data that needs to be sent to the macro base station.

However, it is not enough for the macro base station to merely notify the access node and the user equipment of the RB identifier. The access node and the user equipment need to complete related parameter configuration before performing signaling and/or service data transmission, so as to implement information exchange. Therefore, after the macro base station sends, to the access node, the bearer configuration parameter that carries the RB identifier, the access node can complete bearer configuration according to the bearer configuration parameter.

S102. The macro base station receives a configuration success message from the access node, where the configuration success message carries physical layer parameter configuration information that is configured by the access node for a user equipment.

After completing the bearer configuration, the access node sends the configuration success message to the macro base station, where the configuration success message may carry the physical layer parameter configuration information that is configured by the access node for the user equipment.

Then, after receiving the configuration success message, the macro base station generates a reconfiguration message, where the reconfiguration message may include the bearer configuration parameter and the physical layer parameter configuration information.

S103. The macro base station sends a reconfiguration message to the user equipment, where the reconfiguration message includes at least the RB identifier and/or a logical channel identifier that is reconfigured to transmit on the access node and the physical layer parameter configuration information of the access node.

After generating the reconfiguration message, the macro base station sends the reconfiguration message to the user equipment.

Then, after receiving the reconfiguration message, the user equipment may complete physical layer configuration according to the physical layer parameter configuration information. After that, the user equipment sends signaling and/or service data to the access node according to the RB identifier and/or the logical channel identifier that is reconfigured to transmit on the access node.

Until now, both the user equipment and the access node complete the parameter configuration, and perform the signaling and/or service data transmission. During a process of performing the signaling and/or service data transmission, the user equipment can flexibly distinguish, by using the RB identifier and/or the logical channel identifier, between signaling and/or service data that needs to be sent to the access node and signaling and/or service data that needs to be sent to the macro base station. For example, an SRB2 (signaling radio bearer) that bears NAS (non-access stratum) signaling may be transmitted between the access node and the user equipment; and an RB that bears a VoIP (Voice over Internet Protocol) service may be transmitted between the macro base station and the user equipment.

Figure 2:
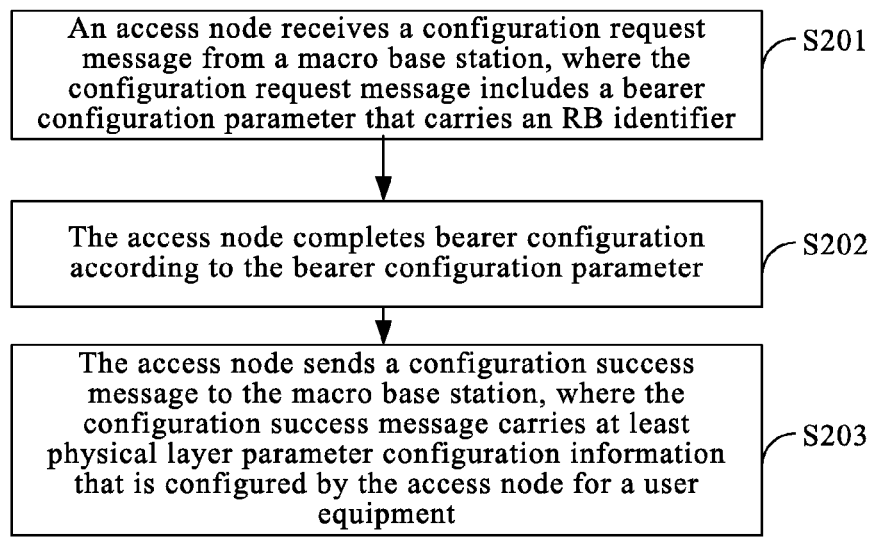
FIG. 2 is a flowchart of another data transmission method according to an embodiment of the present invention.

An embodiment of the present invention provides another data transmission method. As shown in FIG. 2, the method includes the following steps.

S201. An access node receives a configuration request message from a macro base station, where the configuration request message includes a bearer configuration parameter that carries an RB identifier.

After the macro base station determines that a user equipment enters a coverage area of the access node, the access node receives the configuration request message from the macro base station. Exemplarily, the configuration request message may include the bearer configuration parameter that carries the RB identifier.

It should be noted that, how the macro base station determines whether the user equipment enters the coverage area of the access node has been described in the foregoing embodiment, and details are not described herein again.

S202. The access node completes bearer configuration according to the bearer configuration parameter.

After receiving the configuration request message from the macro base station, the access node completes the bearer configuration according to the bearer configuration parameter in the configuration request message.

Exemplarily, the bearer configuration parameter may include: an RB identifier and RB configuration information, where the RB configuration information may include: a PDCP (Packet Data Convergence Protocol) configuration parameter, an RLC (Radio Link Control) configuration parameter, a logical channel identifier, and a logical channel configuration parameter. The PDCP configuration parameter includes all or a part of PDCP entity parameters, such as discarding timer duration and a header compression parameter. The RLC configuration parameter includes all or a part of RLC entity parameters, such as RLC layer mode configuration, where the RLC layer mode configuration includes configuration parameters of the following configuration modes: RLC AM (acknowledgment mode), RLC UM (un-acknowledgment mode), and TM (transparent mode). The logical channel configuration parameter includes an unlink configuration parameter and a downlink configuration parameter, such as a logical channel priority, a prioritized bit rate, and a logical channel group identifier. MAC configuration information includes a discontinuous reception configuration parameter, a HARQ (hybrid automatic repeat request) configuration parameter, and the like.

Further, the access node configures, according to the RB configuration information, a PDCP entity and an RLC entity for each RB indicated by the RB identifier, and the access node configures a MAC entity for the user equipment according to the MAC configuration information, so as to complete RB parameter configuration and physical layer parameter configuration.

S203. The access node sends a configuration success message to the macro base station, where the configuration success message carries at least physical layer parameter configuration information that is configured by the access node for a user equipment.

After completing the bearer configuration according to the bearer configuration parameter, the access node generates the configuration success message and sends the configuration success message to the macro base station, where the configuration success message carries the physical layer parameter configuration information that is configured by the access node for the user equipment.

Further, the macro base station sends a reconfiguration message to the user equipment, where the reconfiguration message includes at least the RB identifier and/or a logical channel identifier that is reconfigured to transmit on the access node and the physical layer parameter configuration information of the access node, so that after the user equipment completes physical layer configuration according to the physical layer parameter configuration information, the user equipment sends signaling and/or service data to the access node according to the RB identifier and/or the logical channel identifier that is reconfigured to transmit on the access node.

Until now, both the user equipment and the access node complete the parameter configuration, and perform the signaling or service data transmission. During a process of performing the signaling or service data transmission, the user equipment may separate, according to the RB identifier, data that needs to be sent to the macro base station and data that needs to be sent to the access node, and the access node may separate, according to the RB identifier, data that needs to be sent to the macro base station and data that needs to be sent to the user equipment.

Figure 3:
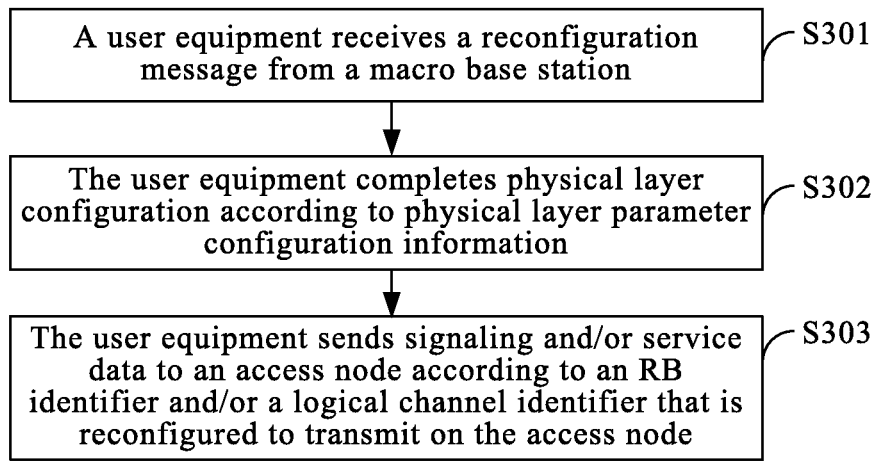
FIG. 3 is a flowchart of still another data transmission method according to an embodiment of the present invention.

An embodiment of the present invention provides still another data transmission method. As shown in FIG. 3, the method includes the following steps.

S301. A user equipment receives a reconfiguration message from a macro base station.

The reconfiguration message includes at least an RB identifier and/or a logical channel identifier that is reconfigured to transmit on an access node and physical layer parameter configuration information of the access node, and the reconfiguration message is sent after that: the macro base station sends a configuration request message to the access node, where the configuration request message includes a bearer configuration parameter that carries the RB identifier, so that after the access node completes bearer configuration according to the bearer configuration parameter, the macro base station receives a configuration success message from the access node, where the configuration success message carries at least the physical layer parameter configuration information that is configured by the access node for the user equipment.

After the macro base station determines that the user equipment enters a coverage area of the access node, the macro base station sends, to the access node, the configuration request message that includes the bearer configuration parameter carrying the RB identifier. Further, the access node completes bearer configuration according to the bearer configuration parameter and sends the configuration success message to the macro base station. After receiving the configuration success message, the macro base station sends the reconfiguration message to the user equipment. The reconfiguration message includes at least the RB identifier and/or the logical channel identifier that is reconfigured to transmit on the access node and the physical layer parameter configuration information of the access node.

It should be noted that, how the macro base station determines whether the user equipment enters the coverage area of the access node has been described in the foregoing embodiment, and details are not described herein again.

S302. The user equipment completes physical layer configuration according to physical layer parameter configuration information.

After the user equipment receives the reconfiguration message from the macro base station, the user equipment may complete the physical layer configuration according to the physical layer parameter configuration information.

S303. The user equipment sends signaling and/or service data to an access node according to an RB identifier and/or a logical channel identifier that is reconfigured to transmit on the access node.

Further, the user equipment sends the signaling and/or service data to the access node according to the RB identifier and/or the logical channel identifier that is reconfigured to transmit on the access node.

Exemplarily, the physical layer parameter configuration information further includes basic information about the access node, where the basic information about the access node includes an uplink/downlink center frequency location, uplink/downlink bandwidth, and a physical cell identifier of the access node.

Further, a method used by the user equipment to perform signaling or service data transmission with the access node according to the physical layer parameter configuration information may include enabling, by the user equipment according to the basic information about the access node, a radio frequency receiver of the user equipment, or adjusting, by the user equipment according to the basic information about the access node, a distance between the radio frequency receiver of the user equipment and a center frequency location of the access node; and sending, by the user equipment, a reconfiguration completion message to the access node, where the reconfiguration completion message includes an identifier of the user equipment, so that the access node performs signaling or service data transmission with the user equipment according to the physical layer parameter configuration information.

Until now, both the user equipment and the access node complete the parameter configuration, and perform the signaling or service data transmission. During a process of performing the signaling or service data transmission, the user equipment may separate, according to the RB identifier, data that needs to be sent to the macro base station and data that needs to be sent to the access node, and the access node may separate, according to the RB identifier, data that needs to be sent to the macro base station and data that needs to be sent to the user equipment.

According to the data transmission method provided in this embodiment of the present invention, a macro base station sends, to an access node, a configuration request message that includes a bearer configuration parameter carrying a radio bearer (RB) identifier; after completing bearer configuration according to the bearer configuration parameter, the access node sends, to the macro base station, a configuration success message that carries physical layer parameter configuration information configured by the access node for a user equipment; further, the macro base station sends, to the user equipment, a reconfiguration message that includes the RB identifier and/or a logical channel identifier that is reconfigured to transmit on the access node and the physical layer parameter configuration information, so that the user equipment completes bearer configuration according to the bearer configuration parameter; and after the user equipment completes physical layer configuration according to the physical layer parameter configuration information, the user equipment sends signaling and/or service data to the access node according to the RB identifier and/or the logical channel identifier that is reconfigured to transmit on the access node. By means of this solution, the user equipment can flexibly distinguish, by using the RB identifier and/or the logical channel identifier, between signaling and/or service data that needs to be sent to the access node and signaling and/or service data that needs to be sent to the macro base station, thereby avoiding a problem in the prior art that simply separating user plane data and control plane signaling results in poor QoS of a service and low usage of a system resource, and further ensuring QoS of the service and improving usage of the system resource.

Figure 4:
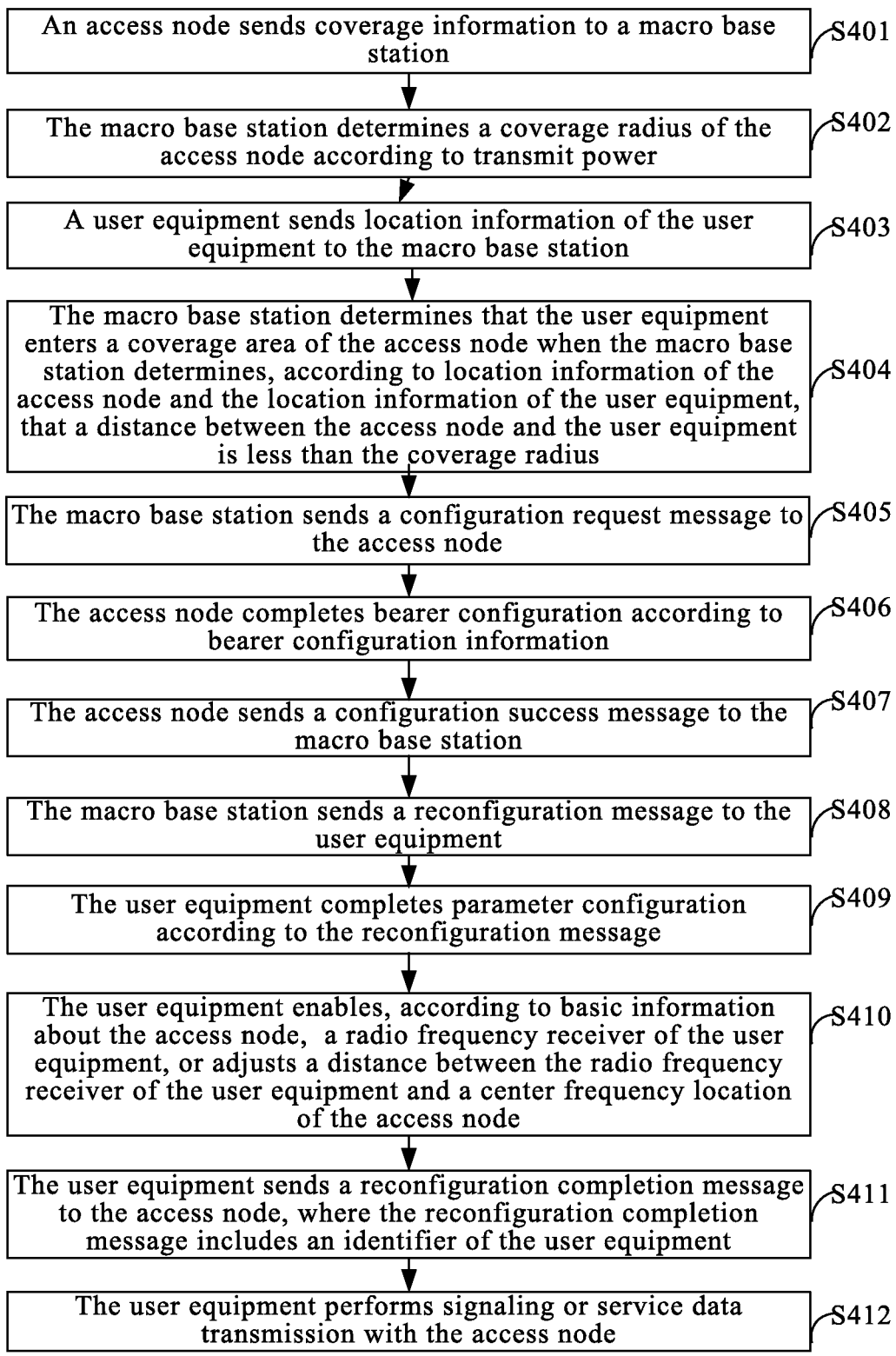
FIG. 4 is a flowchart of still another data transmission method according to an embodiment of the present invention.

An embodiment of the present invention provides still another data transmission method. As shown in FIG. 4, the method includes:

In a communications network according to this embodiment of the present invention, a wired connection may be established between a macro base station and an access node. Exemplarily, an interface between access nodes may be a CPRI (Common Public Radio Interface, Common Public Radio Interface). Further, the macro base station may send, to the access node, data that needs to be sent.

It should be noted that, the access node may be a micro base station, an indoor base station, a low mobility base station, a local wireless access node, a low-power transmit node, or the like, which is not limited in the present invention.

S401. A access node sends coverage information to a macro base station.

After the access node is started or a location of the access node is updated, the access node sends the coverage information to the macro base station, where the coverage information may include location information of the access node, transmit power, and a signal attenuation model.

The location information may include a longitude value, a latitude value, a latitude direction (north and south), and may further include an elevation direction (height, depth) and an elevation value.

S402. The macro base station determines a coverage radius of the access node according to transmit power.

After receiving the coverage information from the access node, the macro base station may calculate the coverage radius of the access node according to the transmit power that is of the access node and in the coverage information, that is, the coverage radius that is of the access node and determined by the macro base station is a threshold; it may be determined, by comparing a distance between the access node and a user equipment with the coverage radius of the access node, whether the user equipment enters the coverage area of the access node.

S403. A user equipment sends location information of the user equipment to the macro base station.

If the macro base station needs to compare the distance between the access node and the user equipment with the coverage radius of the access node, the location information of the user equipment is required. It may be understood that, the user equipment may periodically or aperiodically send the location information of the user equipment to the macro base station.

It should be noted that, there is no time sequence limitation on step S401 and step S403, that is, step S403 may also be implemented before step S401, and step S403 may also be implemented with step S401 at the same time, which is not limited in the present invention.

S404. The macro base station determines that the user equipment enters a coverage area of the access node when the macro base station determines, according to location information of the access node and the location information of the user equipment, that a distance between the access node and the user equipment is less than the coverage radius.

Further, the macro base station determines that the user equipment enters the coverage area of the access node when the macro base station determines, according to the location information of the access node and the location information of the user equipment, that a distance between the access node and the user equipment is less than the coverage radius. A person skilled in the art may easily implement how to calculate the distance between the access node and the user equipment according to the location information of the access node and the location information of the user equipment, and details are not described herein again.

It should be noted that, this embodiment of the present invention exemplarily proposes that the macro base station determines that the user equipment enters the coverage area of the access node when the macro base station determines, according to the location information of the access node and the location information of the user equipment, that a distance between the access node and the user equipment is less than the coverage radius. However, a method used by the macro base station to determine whether the user equipment enters the coverage area of the access node is not limited thereto. The macro base station may also determine, according to RSRP (reference signal received power) and RSRQ (reference signal received quality) that are of the macro base station and measured by the access node, and RSRP and RSRQ that are of the access node and measured by the user equipment, whether the user equipment enters the coverage area of the access node. Because their purposes are all for the macro base station to determine whether the user equipment enters the coverage area of the access node, they should all fall within the protection scope of the present invention.

S405. The macro base station sends a configuration request message to the access node.

After the macro base station determines that the user equipment enters the coverage area of the access node, the macro base station sends the configuration request message to the access node.

The configuration request message includes a number of parameters, which will be discussed in turn.

The configuration request message includes a bearer configuration parameter.

Figure 5:
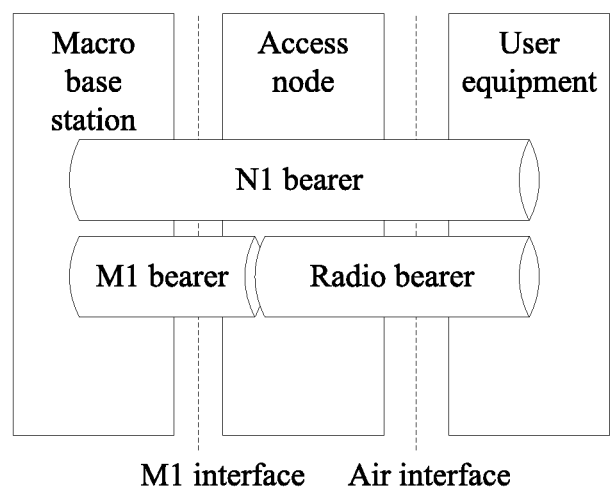
FIG. 5 is a schematic structural diagram of a path for transmitting signaling and/or service data between a macro base station, an access node, and a user equipment according to an embodiment of the present invention.

As shown in FIG. 5, an N1 bearer refers to a path for transmitting signaling/data between the macro base station, the access node, and the user equipment. A radio bearer (RB) refers to a path for transmitting signaling/data between the access node and the user equipment. That is, the radio bearer is a part of the bearer. Each radio bearer (SRB, DRB) corresponds to one bearer.

An N1 bearer configuration parameter includes: a bearer identifier, a GTP tunnel parameter, an RB identifier, and an RB configuration parameter. The bearer identifier and the RB configuration identifier may be the same, and may also be different.

The GTP (General Packet Radio Service Tunneling Protocol, General Packet Radio System Tunneling Protocol) tunnel parameter is a GTP tunnel parameter on the macro base station side, and includes a transport layer identifier and a GTP-TEID (GTP Tunnel Endpoint Identifier, GTP tunnel endpoint identifier). The GTP-TEID is used to identify an address of the bearer on the macro base station side. Carrying the parameter means establishing one GTP tunnel for each bearer between the macro base station and the access node. Transfer of bearer data between the macro base station and the access node is performed by using the GTP tunnel. Specially, for a signaling bearer, a transfer bearer configuration parameter for the bearer data between the macro base station and the access node may also not include a GTP tunnel parameter. Transfer of signaling bearer data between the macro base station and the access node is identified by using the bearer identifier or the RB identifier.

The bearer configuration parameter further includes RB configuration information.

The RB configuration information may include a PDCP configuration parameter, an RLC configuration parameter, a logical channel identifier, and a logical channel configuration parameter.

The PDCP configuration parameter includes all or a part of PDCP entity parameters, such as discarding timer duration and a header compression parameter.

The RLC configuration parameter includes all or a part of RLC entity parameters, such as RLC layer mode configuration, where the RLC layer mode configuration includes configuration parameters of the following configuration modes: RLC AM, RLC UM, and TM.

The logical channel configuration parameter includes an uplink configuration parameter and a downlink configuration parameter, such as a logical channel priority, a prioritized bit rate, and a logical channel group identifier. A bearer parameter may also be defined in the following manners.

An interface between the macro base station and the access node is defined as an M1 interface. A signaling or data bearer on the M1 interface is an M1 bearer. The bearer parameter carried in the message includes an M1 bearer parameter and a radio bearer parameter.

The M1 bearer parameter includes a bearer identifier and a GTP tunnel parameter.

A parameter configured for a radio bearer (a bearer on an air interface between the access node and the user equipment) includes an RB identifier and an RB configuration parameter.

The M1 bearer identifier and the RB identifier may be the same one, and may also be different.

Specially, for signaling M1, an M1 bearer configuration parameter may also not include a GTP tunnel parameter. Transfer of signaling bearer data on the M1 interface is distinguished according to the M1 bearer identifier.

The configuration request message also includes a MAC configuration parameter.

Specifically, the MAC configuration information includes a discontinuous reception configuration parameter, a HARQ configuration parameter, and the like.

The configuration request message also includes a first C-RNTI (cell radio network temporary identifier).

The first C-RNTI is a first C-RNTI allocated by the macro base station to the user equipment, so that after a connection is established between the user equipment and the access node, the access node performs data transmission with the user equipment by using the cell radio network temporary identifier.

The configuration request message also includes a dedicated RACH (random access channel) resource.

If the macro base station is responsible for allocating the dedicated RACH resource of the access node, the configuration request message may further carry a dedicated RACH resource that is used by the user equipment to connect to the access node. Specifically, the dedicated RACH resource is used by the user equipment to send a reconfiguration completion message to the access node in subsequent steps.

S406. The access node completes bearer configuration according to bearer configuration information.

Further, after the access node receives the configuration request message, the access node configures, according to the RB configuration information, a PDCP entity and an RLC entity for each RB indicated by the RB identifier, and the access node configures a MAC entity for the user equipment according to the MAC configuration information, so as to complete RB parameter configuration and physical layer parameter configuration.

The access node establishes, according to the GTP tunnel parameter, a GTP tunnel for each bearer between the access node and the macro base station, where the GTP tunnel is used to bear data that needs to be transmitted.

S407. The access node sends a configuration success message to the macro base station.

After completing bearer configuration, the access node sends the configuration success message to the macro base station. The configuration success message includes information as described below.

The configuration success message includes a bearer configuration parameter.

If a GTP tunnel is established on the N1 or M1 bearer between the macro base station and the access node, the message includes a GTP identifier that is of the access node and allocated by the access node.

The configuration success message also includes a physical layer configuration parameter configured by the access node for the user equipment.

After completing the bearer configuration, the access node needs to notify the user equipment of the physical layer configuration parameter configured for the user equipment, so that the user equipment performs signaling or service data transmission with the access node according to the physical layer configuration parameter.

The configuration success message also includes a dedicated RACH resource.

The dedicated RACH resource is used by the user equipment to send the reconfiguration completion message to the access node in subsequent steps.

The configuration success message also includes uplink grant information.

If the user equipment is configured that not to use the dedicated RACH resource to connect to the access node, but to use an uplink transmission resource to send the reconfiguration completion message to the access node, the configuration success message may further carry uplink grant information of the access node, where the uplink grant information is used by the user equipment to send the reconfiguration completion message to the access node.

The configuration success message also includes a second C-RNTI.

If the user equipment uses different C-RNTIs to perform data transmission on the macro base station and the access node, the configuration success message may further include a second cell radio network temporary identifier allocated by the access node to the user equipment, so that after the user equipment establishes a connection to the access node, the access node uses the second cell radio network temporary identifier to perform data transmission with the user equipment.

S408. The macro base station sends a reconfiguration message to the user equipment.

After receiving the configuration success message, the macro base station sends the reconfiguration message to the user equipment.

The reconfiguration message includes all or a part of information about the access node in the configuration success message.

For example, the physical layer configuration parameter of the access node, the first C-RNTI/second C-RNTI, the uplink grant information, and the dedicated RACH resource.

The reconfiguration message also includes basic information about the access node.

For example, the basic information about the access node includes: a PCI (physical cell identifier) of the access node, an uplink and/or downlink center frequency location, uplink/ downlink bandwidth, and an identifier of the access node. An ARFCN (absolute radio frequency channel number) is used to identify the downlink center frequency location. Because a relative location between the uplink frequency and the downlink frequency is fixed, the uplink center frequency location is clear if the downlink center frequency location is known.

The reconfiguration message also includes an RB identifier and/or the logical channel identifier that is reconfigured to transmit on the access node.

The user equipment sends signaling and/or service data to the access node according to the RB identifier and/or the logical channel identifier that is reconfigured to transmit on the access node.

S409. The user equipment completes parameter configuration according to the reconfiguration message.

Exemplarily, the user equipment may perform RB parameter configuration according to the RB configuration information in the reconfiguration message.

It should be added that, the reconfiguration message may be set in an RRC (radio resource control) connection message of an air interface in the prior art, and the reconfiguration message may also be separately sent, and may also be set in another message, which is not limited in the present invention.

S410. The user equipment enables, according to basic information about the access node, a radio frequency receiver of the user equipment, or adjusts a distance between the radio frequency receiver of the user equipment and a center frequency location of the access node.

Further, corresponding to content carried in the reconfiguration message in step S408, the user equipment may enable, according to the basic information about the access node, the radio frequency receiver of the user equipment, or adjust the distance between the radio frequency receiver of the user equipment and the center frequency location of the access node.

S411. The user equipment sends a reconfiguration completion message to the access node, where the reconfiguration completion message includes an identifier of the user equipment.

After the user equipment enables the radio frequency receiver of the user equipment or adjusts the distance between the radio frequency receiver of the user equipment and the center frequency location of the access node, the user equipment sends the reconfiguration completion message to the access node by using the uplink grant or the dedicated RACH resource that is included in the received reconfiguration message. If the reconfiguration message does not include the uplink grant or the dedicated RACH resource, the user equipment sends the reconfiguration completion message to the access node in a competitive RACH manner.

Specifically, when the user equipment sends the reconfiguration completion message to the access node according to the identifier of the access node, the user equipment start listening to a PDCCH (physical downlink control channel) of the access node.

It should be added that, after the access node receives the reconfiguration completion message, the access node may notify the macro base station that reconfiguration is complete.

S412. The user equipment performs signaling or service data transmission with the access node.

Similarly, after the access node receives the reconfiguration success message from the user equipment, the access node starts listening to an SR (Scheduling Request, scheduling request) of the user equipment.

Optionally, after receiving the reconfiguration completion message forwarded by the access node, the macro base station starts forwarding, to the access node, data that is reconfigured to bear on the access node.

Until now, after both the user equipment and the access node complete the parameter configuration and establish a connection, the user equipment may separate, according to the RB identifier, data that needs to be sent to the macro base station and data that needs to be sent to the access node, and the access node may separate, according to the RB identifier, data that needs to be sent to the macro base station and data that needs to be sent to the user equipment. On an interface between the macro base station and the access node, signaling or service data transmission is performed on the interface by using an established GTP bearer or the bearer identifier.

It should be added that, the reconfiguration success message may also be first sent by the user equipment to the macro base station and then forwarded by the macro base station to the access node, and may also be first sent by the user equipment to the access node and then forwarded by the access node to the macro base station, which is not limited in the present invention. If the reconfiguration success message is first sent by the user equipment to the macro base station and then forwarded by the macro base station to the access node, uplink grant carried in an air interface reconfiguration message that is sent by the macro base station to the user equipment is a resource of the macro base station. It may also be that, the macro base station allocates uplink grant and a dedicated RACH resource to the user equipment by using the PDCCH. Specifically, the user equipment may send, after completing step S409, a scheduling request SR to the macro base station to request uplink scheduling.

Figure 6:
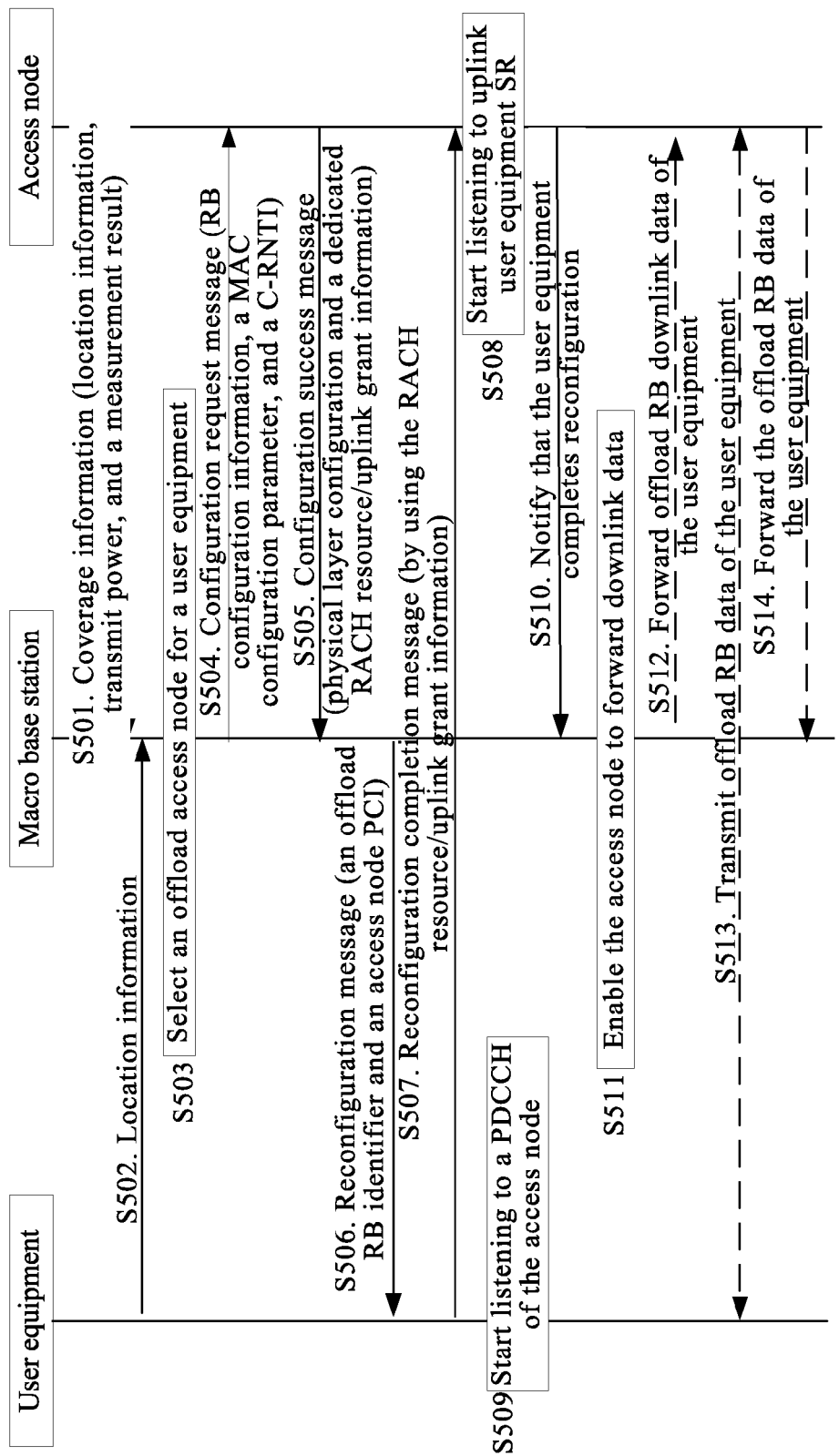
FIG. 6 is a flowchart of still another data transmission method according to an embodiment of the present invention.

Exemplarily, as shown in FIG. 6, a data transmission method provided in an embodiment of the present invention may include the following steps.

S501. An access node sends coverage information (location information, transmit power, and a measurement result) to a macro base station.

S502. A user equipment sends location information to the macro base station.

S503. The macro base station selects an offload access node for the user equipment.

After receiving the coverage information from the access node, the macro base station may calculate a coverage radius of the access node according to the transmit power that is of the access node and in the coverage information, that is, the coverage radius that is of the access node and determined by the macro base station is a threshold; it may be determined, by comparing a distance between the access node and the user equipment with the coverage radius of the access node, whether the user equipment enters the coverage area of the access node. Further, the macro base station selects the offload access node for the user equipment.

S504. The macro base station sends a configuration request message (RB configuration information, a MAC configuration parameter, and a C-RNTI) to the access node.

After the macro base station determines that the user equipment enters the coverage area of the access node, the macro base station sends the configuration request message to the access node. The configuration request message may include the RB configuration information, the MAC configuration parameter, and the C-RNTI.

S505. The access node sends a configuration success message (physical layer configuration and a dedicated RACH resource/uplink grant information) to the macro base station.

Further, after the access node receives the configuration request message, the access node completes RB parameter configuration and physical layer parameter configuration according to the configuration request message, and sends the configuration success message to the macro base station. The configuration success message may include the physical layer configuration and the dedicated RACH resource/uplink grant information.

S506. The macro base station sends a reconfiguration message (an offload RB identifier and an access node PCI) to the user equipment.

After receiving the configuration success message, the macro base station sends the reconfiguration message to the user equipment, where the reconfiguration message may include the offload RB identifier and the access node PCI.

S507. The user equipment sends a reconfiguration completion message (by using the RACH resource/uplink grant information) to the access node.

The user equipment may perform RB parameter configuration according to the RB configuration information in the reconfiguration message, and send the reconfiguration completion message to the access node by using the RACH resource/uplink grant information.

S508. The access node starts listening to uplink user equipment SR.

After receiving the reconfiguration completion message from the user equipment, the access node starts listening to the uplink user equipment SR.

S509. The user equipment starts listening to a PDCCH of the access node.

After sending the reconfiguration completion message to the access node, the user equipment starts listening to the PDCCH channel of the access node.

There is no sequence limitation on step S508 and step S509, that is, step S508 may be performed before step S509 is performed, or step S509 may be performed before step S508 is performed, or step S508 and step S509 may be performed at the same time.

S510. The access node notifies the macro base station that the user equipment completes reconfiguration.

S511. The macro base station enables the access node to forward downlink data.

S512. The macro base station forwards offload RB downlink data of the user equipment to the access node.

S513. Offload RB data of the user equipment is transmitted between the user equipment and the access node.

S514. The access node forwards the offload RB data of the user equipment to the macro base station.

Until now, after both the user equipment and the access node complete the parameter configuration and establish a connection, the user equipment may separate, according to the RB identifier, data that needs to be sent to the macro base station and data that needs to be sent to the access node, and the access node may separate, according to the RB identifier, data that needs to be sent to the macro base station and data that needs to be sent to the user equipment. On an interface between the macro base station and the access node, signaling or service data transmission is performed on the interface by using an established GTP bearer or a bearer identifier.

Figure 7:
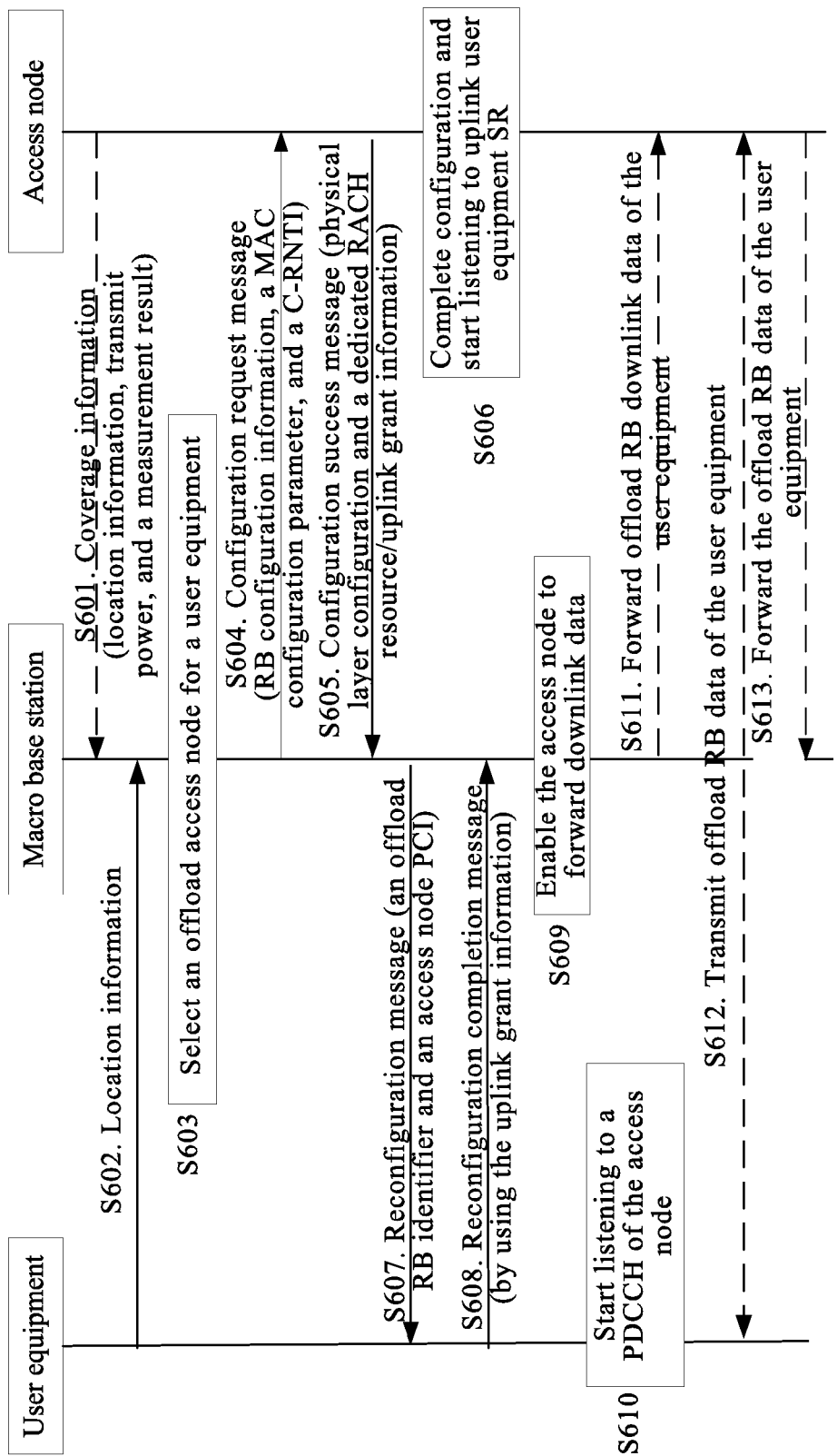
FIG. 7 is a flowchart of still another data transmission method according to an embodiment of the present invention.

Exemplarily, as shown in FIG. 7, a data transmission method provided in an embodiment of the present invention may include the following steps.

S601. An access node sends coverage information (location information, transmit power, and a measurement result) to a macro base station.

S602. A user equipment sends location information to the macro base station.

S603. The macro base station selects an offload access node for the user equipment.

After receiving the coverage information from the access node, the macro base station may calculate a coverage radius of the access node according to the transmit power that is of the access node and in the coverage information, that is, the coverage radius that is of the access node and determined by the macro base station is a threshold. It may be determined, by comparing a distance between the access node and the user equipment with the coverage radius of the access node, whether the user equipment enters the coverage area of the access node. Further, the macro base station selects the offload access node for the user equipment.

S604. The macro base station sends a configuration request message (RB configuration information, a MAC configuration parameter, and a C-RNTI) to the access node.

After the macro base station determines that the user equipment enters the coverage area of the access node, the macro base station sends the configuration request message to the access node. The configuration request message may include the RB configuration information, the MAC configuration parameter, and the C-RNTI.

S605. The access node sends a configuration success message (physical layer configuration and a dedicated RACH resource/uplink grant information) to the macro base station.

Further, after the access node receives the configuration request message, the access node completes RB parameter configuration and physical layer parameter configuration according to the configuration request message, and sends the configuration success message to the macro base station. The configuration success message may include the physical layer configuration and the dedicated RACH resource/uplink grant information.

S606. The access node completes configuration and starts listening to uplink user equipment SR.

After completing the configuration, the access node starts listening to the uplink user equipment SR.

S607. The macro base station sends a reconfiguration message (an offload RB identifier and an access node PCI) to the user equipment.

After receiving the configuration success message from the access node, the macro base station sends the reconfiguration message to the user equipment, where the reconfiguration message may include the offload RB identifier and the access node PCI.

There is no sequence limitation on step S606 and step S607, that is, step S606 may be performed before step S607 is performed, or step S607 may be performed before step S606 is performed, or step S606 and step S607 may be performed at the same time.

S608. The user equipment sends a reconfiguration completion message (by using the uplink grant information) to the macro base station.

The user equipment may perform RB parameter configuration according to the RB configuration information in the reconfiguration message, and send the reconfiguration completion message to the macro base station by using the uplink grant information.

S609. The macro base station enables the access node to forward downlink data.

S610. The user equipment starts listening to a PDCCH channel of the access node.

After sending the reconfiguration completion message to the macro base station, the user equipment starts listening to the PDCCH channel of the access node.

S611. The macro base station forwards offload RB downlink data of the user equipment to the access node.

S612. Offload RB data of the user equipment is transmitted between the user equipment and the access node.

S613. The access node forwards the offload RB data of the user equipment to the macro base station.

Until now, after both the user equipment and the access node complete the parameter configuration and establish a connection, the user equipment may separate, according to the RB identifier, data that needs to be sent to the macro base station and data that needs to be sent to the access node, and the access node may separate, according to the RB identifier, data that needs to be sent to the macro base station and data that needs to be sent to the user equipment. On an interface between the macro base station and the access node, signaling or service data transmission is performed on the interface by using an established GTP bearer or a bearer identifier.

According to the data transmission method provided in this embodiment of the present invention, after a macro base station determines that a user equipment enters a coverage area of an access node, the macro base station sends, to the access node, a configuration request message that includes a bearer configuration parameter carrying a radio bearer (RB) identifier; after completing bearer configuration according to the bearer configuration parameter, the access node sends, to the macro base station, a configuration success message that carries physical layer parameter configuration information configured by the access node for the user equipment; further, the macro base station sends, to the user equipment, a reconfiguration message that includes the RB identifier and/or a logical channel identifier that is reconfigured to transmit on the access node and the physical layer parameter configuration information, so that the user equipment completes bearer configuration according to the bearer configuration parameter; and after the user equipment completes physical layer configuration according to the physical layer parameter configuration information, the user equipment sends signaling and/or service data to the access node according to the RB identifier and/or the logical channel identifier that is reconfigured to transmit on the access node. By means of this solution, the user equipment can flexibly distinguish, by using the RB identifier and/or the logical channel identifier, between signaling and/or service data that needs to be sent to the access node and signaling and/or service data that needs to be sent to the macro base station, thereby avoiding a problem in the prior art that simply separating user plane data and control plane signaling results in poor QoS of a service and low usage of a system resource, and further ensuring QoS of the service and improving usage of the system resource.

Figure 8:
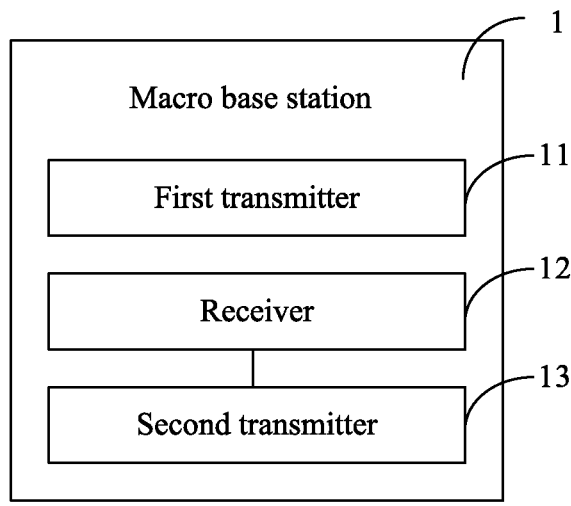
FIG. 8 is a schematic structural diagram of a macro base station according to an embodiment of the present invention.

An embodiment of the present invention provides a macro base station 1. Corresponding to the foregoing method embodiments, each function unit of the macro base station 1 may be used in the foregoing method steps. As shown in FIG. 8, the macro base station 1 includes a first transmitter 11, configured to send a configuration request message to an access node, where the configuration request message includes a bearer configuration parameter that carries a radio bearer (RB) identifier, so that the access node completes bearer configuration according to the bearer configuration parameter; a receiver 12, configured to receive a configuration success message from the access node, where the configuration success message carries at least physical layer parameter configuration information that is configured by the access node for a user equipment; and a second transmitter 13, configured to send a reconfiguration message to the user equipment, where the reconfiguration message includes at least the RB identifier and/or a logical channel identifier that is reconfigured to transmit on the access node and the physical layer parameter configuration information of the access node, so that after the user equipment completes physical layer configuration according to the physical layer parameter configuration information, the user equipment sends signaling and/or service data to the access node according to the RB identifier and/or the logical channel identifier that is reconfigured to transmit on the access node.

Figure 9:
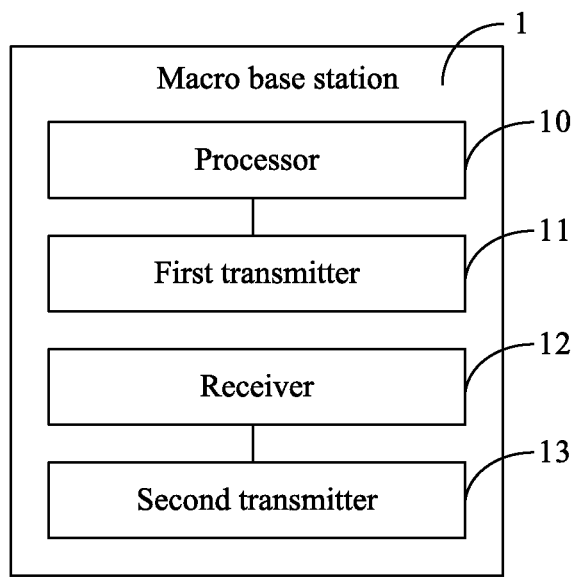
FIG. 9 is a schematic structural diagram of another macro base station according to an embodiment of the present invention.

Further, as shown in FIG. 9, the macro base station 1 further includes a processor 10, configured to determine whether the user equipment enters a coverage area of the access node.

Further, the receiver 12 is further configured to receive coverage information from the access node and receive location information from the user equipment, where the coverage information includes location information of the access node and transmit power; and the processor 10 is specifically configured to determine a coverage radius of the access node according to the transmit power, and determine that the user equipment enters the coverage area of the access node when the macro base station determines, according to the location information of the access node and the location information of the user equipment, that a distance between the access node and the user equipment is less than the coverage radius.

Figure 10:
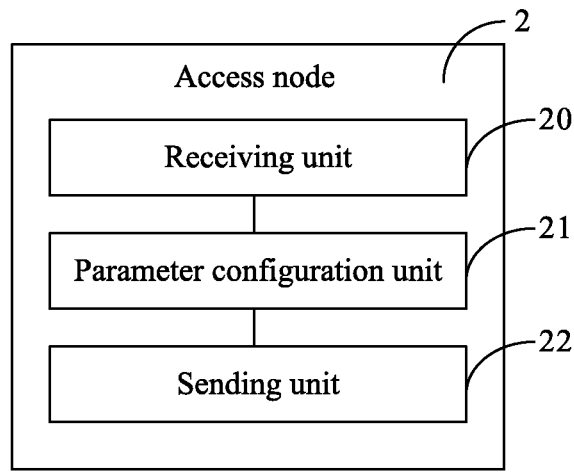
FIG. 10 is a schematic structural diagram of an access node according to an embodiment of the present invention.

An embodiment of the present invention provides an access node 2. Corresponding to the foregoing method embodiments, each function unit of the access node 2 may be used in the foregoing method steps. As shown in FIG. 10, the access node 2 includes: a receiving unit 20, configured to receive a configuration request message from a macro base station and transmit the configuration request message to a parameter configuration unit, where the configuration request message includes a bearer configuration parameter that carries a radio bearer (RB) identifier; a parameter configuration unit 21, configured to receive the configuration request message sent by the receiving unit, complete bearer configuration according to the bearer configuration parameter, and transmit a configuration success message to a sending unit; and a sending unit 22, configured to receive the configuration success message sent by the parameter configuration unit, and send the configuration success message to the macro base station, where the configuration success message carries at least physical layer parameter configuration information that is configured by the access node for a user equipment, so that the macro base station sends a reconfiguration message to the user equipment, where the reconfiguration message includes at least the RB identifier and/or a logical channel identifier that is reconfigured to transmit on the access node and the physical layer parameter configuration information of the access node, so that after the user equipment completes physical layer configuration according to the physical layer parameter configuration information, the user equipment sends signaling and/or service data to the access node according to the RB identifier and/or the logical channel identifier that is reconfigured to transmit on the access node.

Further, the bearer configuration parameter further includes RB configuration information, where the RB configuration information is used by the access node to complete RB parameter configuration.

Further, the RB configuration information includes a PDCP configuration parameter, a Radio Link Control configuration parameter, the logical channel identifier, and a logical channel configuration parameter.

Further, the bearer configuration parameter further includes a Media Access Control MAC configuration parameter, where the MAC configuration parameter includes a discontinuous reception configuration parameter, a hybrid automatic repeat request configuration parameter, and the like.

Further, the parameter configuration unit 21 is specifically configured to receive the configuration request message sent by the receiving unit, and configure, according to the RB configuration information, a PDCP entity and a Radio Link Control entity for each RB indicated by the RB identifier; and the access node configures a MAC entity for the user equipment according to MAC configuration information, and transmit the configuration success message to the sending unit.

Further, the bearer configuration parameter further includes a GTP tunnel parameter.

Further, the parameter configuration unit 21 is further configured to establish a GTP tunnel for each bearer between the access node and the macro base station according to the GTP tunnel parameter, where the GTP tunnel is used to carry data that needs to be transmitted.

Further, the sending unit 22 is further configured to send coverage information to the macro base station, where the coverage information includes location information of the access node and transmit power, so that the macro base station determines a coverage radius of the access node according to the transmit power, and after the macro base station receives location information from the user equipment, the macro base station determines that the user equipment enters a coverage area of the access node when the macro base station determines, according to the location information of the access node and the location information of the user equipment, that a distance between the access node and the user equipment is less than the coverage radius.

Figure 11:
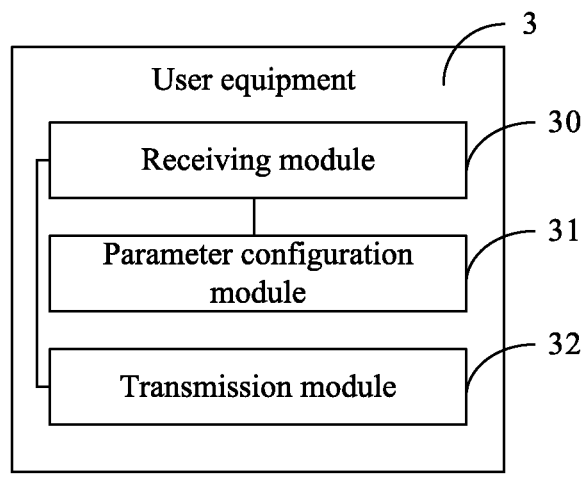
FIG. 11 is a schematic structural diagram of a user equipment according to an embodiment of the present invention.

An embodiment of the present invention provides a user equipment 3. Corresponding to the foregoing method embodiments, each function unit of the user equipment 3 may be used in the foregoing method steps. As shown in FIG. 11, the user equipment 3 includes: a receiving module 30, configured to receive a reconfiguration message from a macro base station and transmit the reconfiguration message to a parameter configuration module and a transmission module, where the reconfiguration message includes at least an RB identifier and/or a logical channel identifier that is reconfigured to transmit on an access node and physical layer parameter configuration information of the access node, and the reconfiguration message is sent after that: the macro base station sends a configuration request message to the access node, where the configuration request message includes a bearer configuration parameter that carries the RB identifier, so that after the access node completes bearer configuration according to the bearer configuration parameter, the macro base station receives a configuration success message from the access node, where the configuration success message carries at least the physical layer parameter configuration information that is configured by the access node for the user equipment; a parameter configuration module 31, configured to receive the reconfiguration message sent by the receiving module and complete physical layer configuration according to the physical layer parameter configuration information; and a transmission module 32, configured to receive the reconfiguration message sent by the receiving module, and send signaling and/or service data to the access node according to the RB identifier and/or the logical channel identifier that is reconfigured to transmit on the access node.

Further, the physical layer parameter configuration information further includes basic information about the access node, where the basic information about the access node includes an uplink and/or downlink center frequency location, uplink/downlink bandwidth, and a physical cell identifier of the access node.

Figure 12:
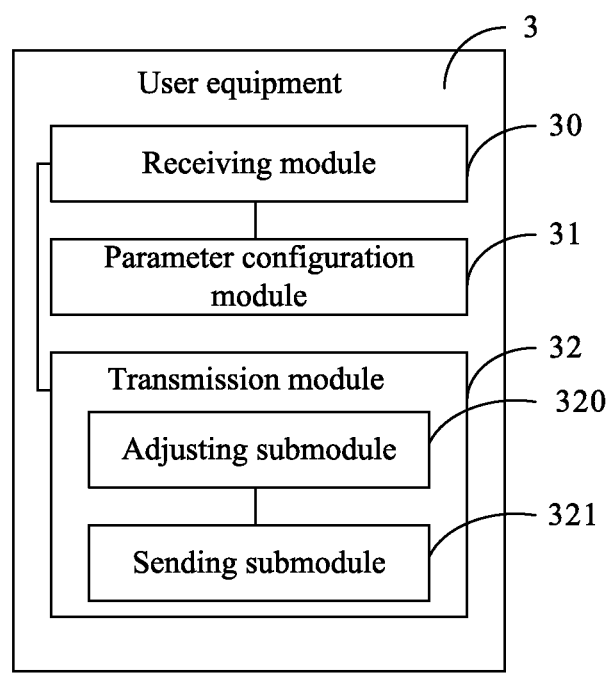
FIG. 12 is a schematic structural diagram of another user equipment according to an embodiment of the present invention.

Further, as shown in FIG. 12, the transmission module 32 includes: an adjusting submodule 320, configured to enable a radio frequency receiver of the user equipment according to the basic information about the access node, or adjust, according to the basic information about the access node, a distance between the radio frequency receiver of the user equipment and a center frequency location of the access node, and transmit a reconfiguration completion message to a sending submodule; and a sending submodule 321, configured to receive the reconfiguration completion message sent by the adjusting submodule, and send the reconfiguration completion message to the access node, where the reconfiguration completion message includes an identifier of the user equipment, so that the access node performs signaling or service data transmission with the user equipment according to the physical layer parameter configuration information.

Figure 13:
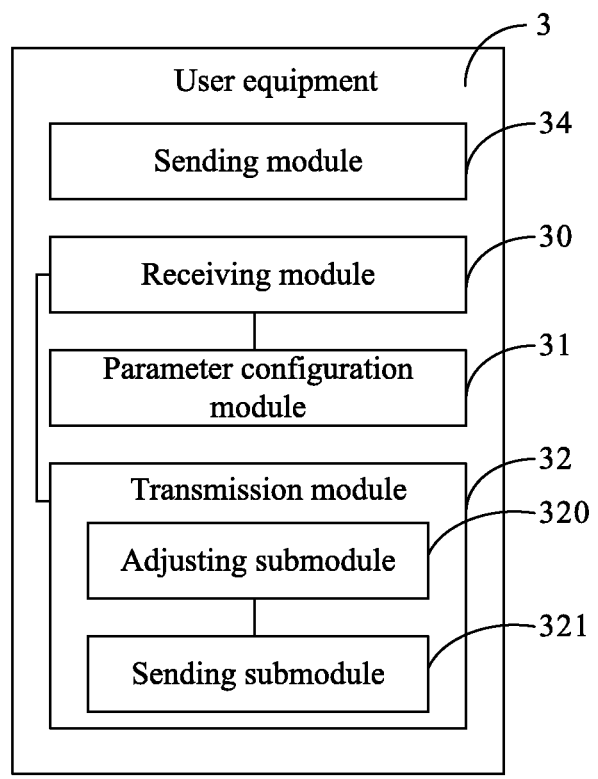
FIG. 13 is a schematic structural diagram of another user equipment according to an embodiment of the present invention.

Further, as shown in FIG. 13, the user equipment 3 further includes: a sending module 34, configured to send location information of the user equipment to the macro base station, so that the macro base station determines that the user equipment enters a coverage area of the access node when the macro base station determines, according to location information of the access node and the location information of the user equipment, that a distance between the access node and the user equipment is less than the coverage radius.

According to the data transmission apparatus provided in this embodiment of the present invention, a macro base station sends, to an access node, a configuration request message that includes a bearer configuration parameter carrying a radio bearer (RB) identifier; after completing bearer configuration according to the bearer configuration parameter, the access node sends, to the macro base station, a configuration success message that carries physical layer parameter configuration information configured by the access node for a user equipment; further, the macro base station sends, to the user equipment, a reconfiguration message that includes the RB identifier and/or a logical channel identifier that is reconfigured to transmit on the access node and the physical layer parameter configuration information, so that the user equipment completes bearer configuration according to the bearer configuration parameter; and after the user equipment completes physical layer configuration according to the physical layer parameter configuration information, the user equipment sends signaling and/or service data to the access node according to the RB identifier and/or the logical channel identifier that is reconfigured to transmit on the access node. By means of this solution, the user equipment can flexibly distinguish, by using the RB identifier and/or the logical channel identifier, between signaling and/or service data that needs to be sent to the access node and signaling and/or service data that needs to be sent to the macro base station, thereby avoiding a problem in the prior art that simply separating user plane data and control plane signaling results in poor QoS of a service and low usage of a system resource, and further ensuring QoS of the service and improving usage of the system resource.

Figure 14:
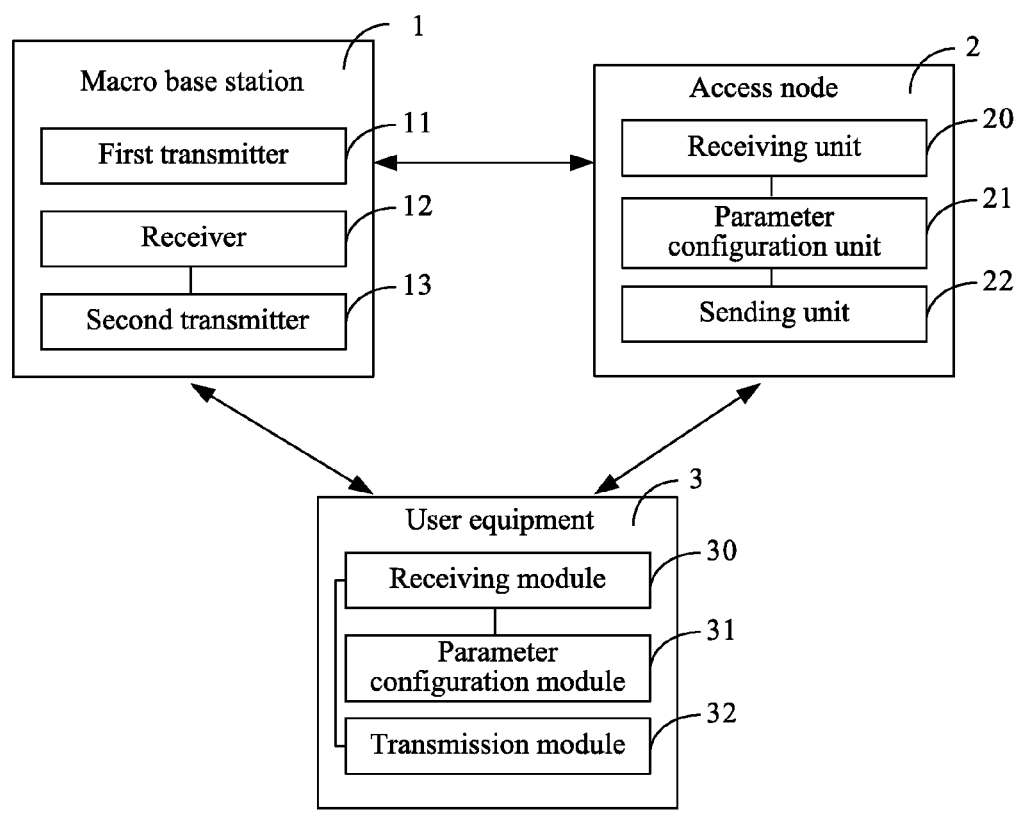
FIG. 14 is a schematic diagram of a communications system according to an embodiment of the present invention.

An embodiment of the present invention provides a communications system. Corresponding to the foregoing method embodiments and apparatus embodiments, each function unit of each apparatus in the system may be used in the foregoing method steps. Reference can now be made to FIG. 14.

The communications system includes the foregoing macro base station, access node and user equipment.

The macro base station specifically includes: the macro base station sends a configuration request message to the access node, where the configuration request message includes a bearer configuration parameter that carries a radio bearer (RB) identifier, so that the access node completes bearer configuration according to the bearer configuration parameter; the macro base station receives a configuration success message from the access node, where the configuration success message carries at least physical layer parameter configuration information that is configured by the access node for the user equipment; the macro base station sends a reconfiguration message to the user equipment, where the reconfiguration message includes at least the RB identifier and/or a logical channel identifier that is reconfigured to transmit on the access node and the physical layer parameter configuration information of the access node, so that after the user equipment completes physical layer configuration according to the physical layer parameter configuration information, the user equipment sends signaling and/or service data to the access node according to the RB identifier and/or the logical channel identifier that is reconfigured to transmit on the access node.

The access node specifically includes: the access node receives the configuration request message from the macro base station, where the configuration request message includes the bearer configuration parameter that carries the radio bearer (RB) identifier; the access node completes the bearer configuration according to the bearer configuration parameter; the access node sends the configuration success message to the macro base station, where the configuration success message carries at least the physical layer parameter configuration information that is configured by the access node for the user equipment, so that the macro base station sends the reconfiguration message to the user equipment, where the reconfiguration message includes at least the RB identifier and/or the logical channel identifier that is reconfigured to transmit on the access node and the physical layer parameter configuration information of the access node, so that after the user equipment completes the physical layer configuration according to the physical layer parameter configuration information, the user equipment sends the signaling and/or the service data to the access node according to the RB identifier and/or the logical channel identifier that is reconfigured to transmit on the access node.

The user equipment specifically includes: the user equipment receives the reconfiguration message from the macro base station, where the reconfiguration message includes at least the RB identifier and/or the logical channel identifier that is reconfigured to transmit on the access node and the physical layer parameter configuration information of the access node, and the reconfiguration message is sent after that: the macro base station sends the configuration request message to the access node, where the configuration request message includes the bearer configuration parameter that carries the RB identifier, so that after the access node completes the bearer configuration according to the bearer configuration parameter, the macro base station receives the configuration success message from the access node, where the configuration success message carries at least the physical layer parameter configuration information that is configured by the access node for the user equipment; the user equipment completes the physical layer configuration according to the physical layer parameter configuration information; and the user equipment sends the signaling and/or the service data to the access node according to the RB identifier and/or the logical channel identifier that is reconfigured to transmit on the access node.

According to the communications system provided in this embodiment of the present invention, a macro base station sends, to an access node, a configuration request message that includes a bearer configuration parameter carrying a radio bearer (RB) identifier; after completing bearer configuration according to the bearer configuration parameter, the access node sends, to the macro base station, a configuration success message that carries physical layer parameter configuration information configured by the access node for a user equipment; further, the macro base station sends, to the user equipment, a reconfiguration message that includes the RB identifier and/or a logical channel identifier that is reconfigured to transmit on the access node and the physical layer parameter configuration information, so that the user equipment completes bearer configuration according to the bearer configuration parameter; and after the user equipment completes physical layer configuration according to the physical layer parameter configuration information, the user equipment sends signaling and/or service data to the access node according to the RB identifier and/or the logical channel identifier that is reconfigured to transmit on the access node. By means of this solution, the user equipment can flexibly distinguish, by using the RB identifier and/or the logical channel identifier, between signaling and/or service data that needs to be sent to the access node and signaling and/or service data that needs to be sent to the macro base station, thereby avoiding a problem in the prior art that simply separating user plane data and control plane signaling results in poor QoS of a service and low usage of a system resource, and further ensuring QoS of the service and improving usage of the system resource.

It may be clearly understood by a person skilled in the art that, for ease and brevity of description, division of the foregoing function modules is used as an example for illustration. In actual application, the foregoing functions can be allocated to different function modules and implemented according to a requirement, that is, an inner structure of an apparatus is divided into different function modules to implement all or a part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual requirements to achieve the purposes of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
    sending, by a macro base station, a configuration request message to an access node, wherein the configuration request message comprises a bearer configuration parameter that carries a radio bearer (RB) identifier;
    receiving, by the macro base station, a configuration success message from the access node after the access node has completed bearer configuration according to the bearer configuration parameter, wherein the configuration success message carries physical layer parameter configuration information that has been configured by the access node for a user equipment; and
    sending, by the macro base station, a reconfiguration message to the user equipment, wherein the reconfiguration message comprises the RB identifier and/or a logical channel identifier that is reconfigured to transmit on the access node and the physical layer parameter configuration information of the access node, so that after the user equipment completes physical layer configuration according to the physical layer parameter configuration information, the user equipment sends signaling and/or service data to the access node according to the RB identifier and/or the logical channel identifier that is reconfigured to transmit on the access node.

2. The data transmission method according to claim 1, wherein, before sending the configuration request message to the access node, the method further comprises determining, by the macro base station, that the user equipment enters a coverage area of the access node.

3. The data transmission method according to claim 2, wherein determining that the user equipment enters a coverage area of the access node comprises:
    receiving, by the macro base station, coverage information from the access node, wherein the coverage information comprises location information of the access node and transmit power;
    determining, by the macro base station, a coverage radius of the access node according to the transmit power;
    receiving, by the macro base station, location information from the user equipment; and
    determining, by the macro base station, that the user equipment enters the coverage area of the access node when the macro base station determines, according to the location information of the access node and the location information of the user equipment, that a distance between the access node and the user equipment is less than the coverage radius.

4. A data transmission method, comprising:
    receiving, by an access node, a configuration request message from a macro base station, wherein the configuration request message comprises a bearer configuration parameter that carries a radio bearer (RB) identifier;
    completing, by the access node, bearer configuration according to the bearer configuration parameter; and
    sending, by the access node, a configuration success message to the macro base station, wherein the configuration success message carries physical layer parameter configuration information that is configured by the access node for a user equipment, so that the macro base station sends a reconfiguration message to the user equipment, wherein the reconfiguration message comprises at least the RB identifier and/or a logical channel identifier that is reconfigured to transmit on the access node and the physical layer parameter configuration information of the access node, so that after the user equipment completes physical layer configuration according to the physical layer parameter configuration information, the user equipment sends signaling and/or service data to the access node according to the RB identifier and/or the logical channel identifier that is reconfigured to transmit on the access node.

5. The data transmission method according to claim 4, wherein the bearer configuration parameter further comprises RB configuration information, wherein the RB configuration information is used for the access node to complete RB parameter configuration.

6. The data transmission method according to claim 4, wherein completing the bearer configuration according to the bearer configuration parameter comprises configuring, by the access node according to RB configuration information, a PDCP entity and a Radio Link Control entity for each RB indicated by the RB identifier, and configuring, by the access node according to MAC configuration information, a MAC entity for the user equipment.

7. A data transmission method, comprising:
    receiving, by a user equipment, a reconfiguration message from a macro base station, wherein the reconfiguration message comprises an radio bearer (RB) identifier and/or a logical channel identifier that is reconfigured to transmit on an access node and physical layer parameter configuration information of the access node, and the reconfiguration message is sent after the macro base station sends a configuration request message to the access node, wherein the configuration request message comprises a bearer configuration parameter that carries the RB identifier, so that after the access node completes bearer configuration according to the bearer configuration parameter, the macro base station receives a configuration success message from the access node, wherein the configuration success message carries at least the physical layer parameter configuration information that is configured by the access node for the user equipment;
    completing, by the user equipment, physical layer configuration according to the physical layer parameter configuration information; and
    sending, by the user equipment, signaling and/or service data to the access node according to the RB identifier and/or the logical channel identifier that is reconfigured to transmit on the access node.

8. The data transmission method according to claim 7, wherein the physical layer parameter configuration information further comprises basic information about the access node, wherein the basic information about the access node comprises an uplink and/or downlink center frequency location, uplink/downlink bandwidth, and a physical cell identifier of the access node.

9. The data transmission method according to claim 8, wherein completing the physical layer configuration according to the physical layer parameter configuration information comprises:
   enabling, by the user equipment according to the basic information about the access node, a radio frequency receiver of the user equipment, or adjusting, by the user equipment according to the basic information about the access node, a distance between the radio frequency receiver of the user equipment and a center frequency location of the access node; and
   sending, by the user equipment, a reconfiguration completion message to the access node, wherein the reconfiguration completion message comprises an identifier of the user equipment, so that the access node performs signaling or service data transmission with the user equipment according to the physical layer parameter configuration information.

10. The data transmission method according to claim 7, wherein, before receiving the reconfiguration message from the macro base station, the method further comprises sending, by the user equipment, location information of the user equipment to the macro base station, so that the macro base station determines that the user equipment enters a coverage area of the access node when the macro base station determines, according to the location information of the access node and the location information of the user equipment, that a distance between the access node and the user equipment is less than a coverage radius.

11. A macro base station, comprising:
   a first transmitter, configured to send a configuration request message to an access node, wherein the configuration request message comprises a bearer configuration parameter that carries a radio bearer (RB) identifier, so that the access node completes bearer configuration according to the bearer configuration parameter;
   a receiver, configured to receive a configuration success message from the access node, wherein the configuration success message carries at least physical layer parameter configuration information that is configured by the access node for a user equipment; and
   a second transmitter, configured to send a reconfiguration message to the user equipment, wherein the reconfiguration message comprises at least the RB identifier and/or a logical channel identifier that is reconfigured to transmit on the access node and the physical layer parameter configuration information of the access node, so that after the user equipment completes physical layer configuration according to the physical layer parameter configuration information, the user equipment sends signaling and/or service data to the access node according to the RB identifier and/or the logical channel identifier that is reconfigured to transmit on the access node.

12. The macro base station according to claim 11, further comprising a processor, configured to determine whether the user equipment enters a coverage area of the access node.

13. The macro base station according to claim 12, wherein:
   the receiver is further configured to receive coverage information from the access node, and receive location information from the user equipment, wherein the coverage information comprises location information of the access node and transmit power; and
   the processor is configured to determine a coverage radius of the access node according to the transmit power, and to determine that the user equipment enters the coverage area of the access node when the macro base station determines, according to the location information of the access node and the location information of the user equipment, that a distance between the access node and the user equipment is less than the coverage radius.

14. An access node, comprising:
   a receiver, configured to receive a configuration request message from a macro base station, wherein the configuration request message comprises a bearer configuration parameter that carries a radio bearer (RB) identifier;
   a processor, configured to receive the configuration request message and to complete bearer configuration according to the bearer configuration parameter, and to create a configuration success message; and
   a transmitter, configured to receive the configuration success message and to send the configuration success message to the macro base station, wherein the configuration success message carries at least physical layer parameter configuration information that is configured by the access node for a user equipment, so that the macro base station sends a reconfiguration message to the user equipment, wherein the reconfiguration message comprises at least the RB identifier and/or a logical channel identifier that is reconfigured to transmit on the access node and the physical layer parameter configuration information of the access node, so that after the user equipment completes physical layer configuration according to the physical layer parameter configuration information, the user equipment sends signaling and/or service data to the access node according to the RB identifier and/or the logical channel identifier that is reconfigured to transmit on the access node.

15. The access node according to claim 14, wherein the processor is specifically configured to configure, according to RB configuration information, a PDCP entity and a Radio Link Control entity for each RB indicated by the RB identifier; and the access node configures a MAC entity for the user equipment according to MAC configuration information.

16. The access node according to claim 14, wherein the transmitter is further configured to send coverage information to the macro base station, wherein the coverage information comprises location information of the access node and transmit power, so that the macro base station determines a coverage radius of the access node according to the transmit power, and after the macro base station receives location information from the user equipment, the macro base station determines that the user equipment enters a coverage area of the access node when the macro base station determines, according to the location information of the access node and the location information of the user equipment, that a distance between the access node and the user equipment is less than the coverage radius.

17. A user equipment, comprising:
   a receiver, configured to receive a reconfiguration message from a macro base station, wherein the reconfiguration message comprises at least a radio bearer (RB) identifier and/or a logical channel identifier that is reconfigured to transmit on an access node and physical layer parameter configuration information of the access node, and the reconfiguration message is sent after the macro base station sends a configuration request message to the access node, wherein the configuration request message comprises a bearer configuration parameter that carries the RB identifier, so that after the access node completes bearer configuration according to the bearer configuration parameter, the macro base station receives a configuration success message from the access node, wherein the configuration success message carries at least the physical layer parameter configuration information that is configured by the access node for the user equipment;

a processor, configured to receive the reconfiguration message from the receiver and to complete physical layer configuration according to the physical layer parameter configuration information; and a transmitter, configured to receive the reconfiguration message from the receiver and to send signaling and/or service data to the access node according to the RB identifier and/or the logical channel identifier that is reconfigured to transmit on the access node.

18. The user equipment according to claim 17, wherein the physical layer parameter configuration information further comprises basic information about the access node, wherein the basic information about the access node comprises an uplink and/or downlink center frequency location, uplink/downlink bandwidth, and a physical cell identifier of the access node.

19. The user equipment according to claim 18, wherein the transmitter:

an adjusting submodule, configured to enable a radio frequency receiver of the user equipment according to the basic information about the access node, or adjust, according to the basic information about the access node, a distance between the radio frequency receiver of the user equipment and a center frequency location of the access node, and transmit a reconfiguration completion message to a sending submodule; and the sending submodule, which is configured to receive the reconfiguration completion message sent by the adjusting submodule, and send the reconfiguration completion message to the access node, wherein the reconfiguration completion message comprises an identifier of the user equipment, so that the access node performs signaling or service data transmission with the user equipment according to the physical layer parameter configuration information.

20. The user equipment according to claim 17, wherein the user equipment further comprises a sending module, configured to send location information of the user equipment to the macro base station, so that the macro base station determines that the user equipment enters a coverage area of the access node when the macro base station determines, according to the location information of the access node and the location information of the user equipment, that a distance between the access node and the user equipment is less than a coverage radius of the coverage area.

* * * * *